Patented May 22, 1928.

1,670,504

UNITED STATES PATENT OFFICE.

ROBERT GRIESSBACH, OTTO BALZ, AND ADOLF RÖSSLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF DI-AMMONIUM PHOSPHATE.

No Drawing. Application filed February 19, 1926, Serial No. 89,414, and in Germany February 20, 1925.

It is known that the direct production of solid di-ammonium phosphate from its components is attended with great difficulties as the said salt is readily soluble, in contradistinction to mono-ammonium phosphate and especially tri-ammonium phosphate which are considerably less soluble; in consequence of these facts, di-ammonium phosphate can be produced only within a very limited range of conditions. A further difficulty is the property of di-ammonium phosphate solutions to split off considerable quantities of ammonia, when heated. For these reasons, di-ammonium phosphate when produced directly from its components, is generally contaminated by mono-ammonium or tri-ammonium phosphate depending on the conditions of working. Therefore it has hitherto been preferred to manufacture pure di-ammonium phosphate indirectly by first preparing tri-ammonium phosphate which can be conveniently obtained and converting same into di-ammonium phosphate by heating gently.

We have now found that solid di-ammonium phosphate can be obtained practically free from other ammonium phosphates directly from its components by maintaining the ratio of the components all the time at 1 molecular proportion of phosphoric acid to between about 1.5 and 2 molecular proportions of ammonia. It is advantageous to start from a solution of pure di-ammonium phosphate saturated at room temperature and to add phosphoric acid, preferably concentrated acid, while vigorously stirring, until a ratio of about 1 molecular proportion of phosphoric acid to 1.5 molecular proportions of ammonia is obtained. Thereupon concentrated phosphoric acid and gaseous ammonia are simultaneously introduced in about the same molecular proportion which accordingly is approximately maintained all the time and which should not substantially be surpassed in the direction of a greater content of phosphoric acid. The solution is then cooled to room temperature and gaseous ammonia is introduced while or after cooling until the solution contains 2 molecular proportions of ammonia for each one molecular proportion of phosphoric acid. Pure di-ammonium phosphate separates in a quantity corresponding about to the quantity of phosphoric acid previously added.

The range of molecular proportions within which to keep according to our invention may be determined by titration or by employing indicators with suitable transition points or by measuring the potential.

Our process may also be carried out in a continuous manner by bringing together phosphoric acid and ammonia continuously while keeping within a ratio of 1 molecular proportion of phosphoric acid to about 1.5 molecular proportions of ammonia, allowing water to evaporate in consequence of the heat of the reaction or of express heating, withdrawing a part of the solution corresponding to the quantity of added materials whether continuously or at intervals, neutralizing the separated part with ammonia to produce a ratio of 1 to 2 molecular proportions, cooling to separate di-ammonium phosphate and reintroducing the mother liquor so obtained into the first stage of the process.

It is advantageous to employ phosphoric acid of such a concentration, that the amount of heat produced by the neutralization, just suffices to evaporate the water contained in the phosphoric acid. When employing phosphoric acid of a higher concentration than indicated above it is advantageous to cool a little more when neutralizing or to add the ammonia partly in the form of an aqueous solution. When working with more dilute phosphoric acid, the temperature of the reaction is preferably chosen somewhat higher, or a heating device may be employed in order to increase the evaporation of water. This last mentioned manner of working is sometimes more advantageous than the use of highly concentrated phosphoric acid, especially in case the highly concentrated acid must be prepared by evaporation, as the materials of the apparatus used for evaporating are much less attacked by the partially neutralized solution than by the free acid. In case of only slightly diluted solutions cooling by means of a vacuum is sometimes sufficient for evaporating the water introduced in the course of the process. In any case, even when applying a vacuum and at high temperatures, the losses of ammonia are very small.

The process allows of producing in a simple manner solid, substantially pure, di-ammonium phosphate from ammonia and phosphoric acid which is excellently suitable as a fertilizer and is readily spreadable. The product is of a uniform nature and the size of its grains may be influenced within rather wide limits in any desired manner. A further advantage is that the water introduced with the phosphoric acid is evaporated, while at the same time utilizing the heat of the reaction, without substantial loss of ammonia and without trouble for the apparatus as would occur when first concentrating the phosphoric acid. Further, impurities contained in the phosphoric acid, such as for example iron and aluminium phosphate, can be readily removed by filtering the solution before introducing the last part of the ammonia.

The following examples will further illustrate how our invention may be carried out in practice but the invention is not limited to these examples.

Example 1.

Phosphoric acid of 66 per cent strength is caused to run into a solution of di-ammonium phosphate reacting neutrally to cresol red and saturated at room temperature (containing about 630 kilograms of the said salt in each cubic metre of water) until the solution changes the color of brome-cresol purple, for which purpose about 240 kilograms of the said phosphoric acid are necessary for each cubic metre of di-ammonium phosphate solution. Thereupon gaseous ammonia and phosphoric acid are introduced simultaneously in a molecular proportion of 1.5 to 1. The proportions of the components may be controlled in a simple manner by trying a test portion, after diluting and cooling, if necessary, with brome-cresol purple. The solution grows very hot on account of the considerable heat of neutralization, so that the water contained in the phosphoric acid added is evaporated substantially without loss of ammonia occurring at the said proportions. It is advantageous, especially for avoiding too much water being evaporated, to prevent the temperature from surpassing about 80 or 90° C. After 150 kilograms of gaseous ammonia and 880 kilograms of 66 per cent phosphoric acid or multiples of these quantities have been added to each cubic metre of the acidulated di-ammonium phosphate solution, the mixture is gradually cooled to room temperature and gaseous ammonia is introduced until the solution again assumes a neutral reaction to cresol red, for which purpose about 105 kilograms of gaseous ammonia or, depending on the quantity of phosphoric acid employed, a multiple thereof is required. By this treatment the di-ammonium phosphate is precipitated in a quantity corresponding about to the quantity of phosphoric acid employed, free from mono-ammonium and tri-ammonium phosphate, forming coarse crystals which can be easily spread on crops. The salt is ready for shipping after being sucked off and dried. The mother liquor may serve as starting solution for a new operation.

Example 2.

From 2 to 3 parts, by weight, of a dilute mixture of phosphoric acid and ammonia obtained by neutralizing crude phosphoric acid (prepared by decomposing phosphate rock by means of sulfuric acid and containing about 20 per cent of phosphoric acid and 2 per cent of sulfuric acid) with ammonia in a molecular proportion of 1 to 1.5 and filtering off the aluminium phosphate precipitated thereby, are introduced into 1 part, by weight, of a di-ammonium phosphate solution containing some ammonium sulfate, as it may be obtained by the process here described. The resulting solution is evaporated until it has a specific gravity of about 36° Bé.; this can be done without substantial loss of ammonia. Thereupon the solution is cooled to room temperature while introducing ammonia until it contains 2 molecular proportions thereof to each one molecular proportion of phosphoric acid. A salt separates out containing about from 50 to 51 per cent of $P_2O_5$ and 25.4 per cent of $NH_3$, besides some ammonium sulfate, which is filtered off from the mother liquor, and the latter may be used again as starting solution. The contents in sulfate is not increased so that no trouble is caused by the presence of this salt.

We claim:

1. The process of manufacturing solid di-ammonium phosphate which consists in neutralizing phosphoric acid with ammonia, while always maintaining a ratio of 1 molecular proportion of the former to about from 1.5 to 2 molecular proportions of the latter, cooling to about room temperature and introducing ammonia up to a molecular proportion of about 1 to 2.

2. The process of manufacturing solid di-ammonium phosphate which consists in adding to a di-ammonium phosphate solution saturated at room temperature, phosphoric acid, but in a smaller amount than would cause the proportion of ammonia to be reduced to below about 1.5 molecular proportion of ammonia for each one molecular proportion of phosphoric acid, introducing phosphoric acid and ammonia in about the said proportion, cooling to about room temperature and introducing ammonia to bring the ratio up to a molecular proportion of about 2 to 1.

3. The process of manufacturing solid di-ammonium phosphate which consists in neutralizing phosphoric acid with ammonia, while always mantaining a ratio of 1 molecular proportion of the former to about from 1.5 to 2 molecular proportions of the latter, evaporating part of the water, cooling to about room temperature and introducing ammonia up to a molecular proportion of about 1 to 2.

4. The process of manufacturing solid di-ammonium phosphate which consists in adding to a di-ammonium phosphate solution saturated at room temperature phosphoric acid, but in a smaller amount than would cause the proportion of ammonia to be reduced to below about 1.5 molecular proportions of ammonia for each one molecular proportion of phosphoric acid, introducing phosphoric acid and ammonia in about the said proportion, while evaporating water, removing part of the solution, cooling this part to about room temperature and introducing ammonia into this solution to bring the ratio up to a molecular proportion of about 1 to 2, separating the di-ammonium phosphate and reintroducing the mother liquor into the first stage of the process.

In testimony whereof we have hereunto set our hands.

ROBERT GRIESSBACH.
OTTO BALZ.
ADOLF RÖSSLER.